(12) United States Patent
Chassaing et al.

(10) Patent No.: US 12,479,835 B2
(45) Date of Patent: *Nov. 25, 2025

(54) PROCESS FOR PREPARING 1-([3R,4S)-4-CYANOTETRAHYDROPYRAN-3-YL]-3-[(2-FLUORO-6-METHOXY-4-PYRIDYL)AMINO]PYRAZOLE-4-CARBOXAMIDE

(71) Applicant: Intervet Inc., Rahway, NJ (US)

(72) Inventors: Christophe Pierre Alain Chassaing, Ingelheim am Rhein (DE); Jingjun Yin, Green Brook, NJ (US); Lichen Song, Beijing (CN); Wensong Xiao, Beijing (CN); Edward Cleator, Whittlesford (GB); Thomas Dahmen, Partenheim (DE); Daniel Salanta, Nieder-Olm (GB); Claudia Scheipers, Ingelheim (DE); Harald Schmitt, Mainz (DE)

(73) Assignee: Intervet Inc., Rahway, NJ (US)

( * ) Notice: Subject to any disclaimer, the term of this patent is extended or adjusted under 35 U.S.C. 154(b) by 1074 days.

This patent is subject to a terminal disclaimer.

(21) Appl. No.: 17/311,615

(22) PCT Filed: Dec. 12, 2019

(86) PCT No.: PCT/EP2019/084887
§ 371 (c)(1),
(2) Date: Jun. 7, 2021

(87) PCT Pub. No.: WO2020/120673
PCT Pub. Date: Jun. 18, 2020

(65) Prior Publication Data
US 2022/0017499 A1    Jan. 20, 2022

(30) Foreign Application Priority Data

Dec. 13, 2018  (EP) ..................... 18212188
Dec. 13, 2018  (WO) ................ PCT/CN2018/120821

(51) Int. Cl.
*C07D 405/14*    (2006.01)
(52) U.S. Cl.
CPC ................. *C07D 405/14* (2013.01)
(58) Field of Classification Search
CPC .................................................. C07D 405/14
See application file for complete search history.

(56) References Cited

U.S. PATENT DOCUMENTS

| 2013/0143907 A1 | 6/2013 | Norimine et al. |
| 2014/0045813 A1 | 2/2014 | Bentzien et al. |
| 2021/0332027 A1 | 10/2021 | Chen et al. |
| 2022/0204483 A1* | 6/2022 | Chassaing ............ C07D 405/04 |

FOREIGN PATENT DOCUMENTS

| WO | 2004052880 A1 | 6/2004 |
| WO | 2009151598 A1 | 12/2009 |
| WO | 2010017047 A1 | 2/2010 |
| WO | 2012062752 A1 | 5/2012 |
| WO | 2013006596 A1 | 1/2013 |
| WO | 2013040863 A1 | 3/2013 |
| WO | 2013041042 A1 | 3/2013 |
| WO | 2015048662 A2 | 4/2015 |
| WO | 2016016369 A1 | 2/2016 |
| WO | 2016184652 A1 | 11/2016 |
| WO | 2016184652 A9 | 11/2016 |
| WO | 2018108969 A1 | 6/2018 |
| WO | 2018111663 A1 | 6/2018 |

OTHER PUBLICATIONS

Sadler, Scott A. et al., Iridium-catalyzed C—H borylation of pyridines, Organic & Biomolecular Chemistry, 2014, 7318-7327, 12.
Siu T et al, The discovery of 3-((4-chloro-3-methoxyphenyl)amino)-1-((3R,4S)-4-cyanotetrahydro-2H-pyran-3-yl)-1H-pyrazole-4-carboxamide, a highly ligand efficient and efficacious janus kinase 1 selective inhibitor with favorable pharmacokinetic properties, Journal of Medicinal Chemistry, 2017, pp. 9676-9690, vol. 60, No. 23.
Taylor, Nicholas J. et al., Derisking the Cu-Mediated 18F-Fluorination of Heterocyclic Positron Emission Tomography Radioligands, Journal of the American Chemical Society, 2017, 8267-8276, 139.
Shieh, Wen-Chung et al., Development of a Total Telescoped Synthesis of a Renin Inhibitor Containing 3,4,5-Substituted Piperidine with Sterically Hindered Amide Bonds, Org. Process Res. Dev., 18, 1339-1344, 2014.
Thompson, Alicia L. S. et al., The Conversion of Phenols to the Corresponding Aryl Halides Under Mild Conditions, Synthesis, 4, 547-550, 2005.

* cited by examiner

Primary Examiner — John S Kenyon
(74) Attorney, Agent, or Firm — David J. Kerwick

(57) ABSTRACT

The application relates to processes for the preparation of 1-[(3R,4S)-4-cyanotetrahydropyran-3-yl]-3-[(2-fluoro-6-methoxy-4-pyridyl) amino]pyrazole-4-carboxamide (I) which include (i) a synthesis for bromo and iodo pyridine intermediates, (ii) a synthesis of a pyrazole ester intermediate which can be obtained in enantiopure form and (iii) the combination of these intermediates into compound (I).

25 Claims, No Drawings

PROCESS FOR PREPARING 1-([3R,4S)-4-CYANOTETRAHYDROPYRAN-3-YL]-3-[(2-FLUORO-6-METHOXY-4-PYRIDYL) AMINO]PYRAZOLE-4-CARBOXAMIDE

CROSS-REFERENCE TO RELATED APPLICATIONS

This application is a national stage entry under 35 U.S.C. § 371 of PCT/EP2019/084887 filed on Dec. 12, 2019, which claims priority to PCT/CN2018/120821 filed on Dec. 13, 2018, which claims priority to EP18212188.9 filed on Dec. 13, 2018, the content of PCT/EP2019/084887 is hereby incorporated by reference in its entirety.

BACKGROUND

WO 2018/108969 discloses compounds of formula I which are selective Janus kinase (JAK) inhibitors, and as such are useful for the treatment of JAK-mediated diseases such as atopic dermatitis, arthritis, and cancer. Specifically, 1-[(3R,4S)-4-cyanotetrahydropyran-3-yl]-3-[(2-fluoro-6-methoxy-4-pyridyl)amino]pyrazole-4-carboxamide (I) is disclosed.

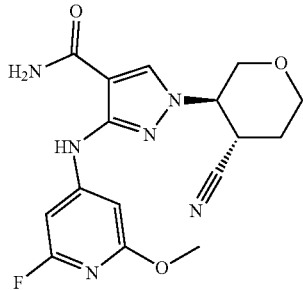

Formula (I)

The known synthesis of 1-[(3R,4S)-4-cyanotetrahydropyran-3-yl]-3-[(2-fluoro-6-methoxy-4-pyridyl)amino]pyrazole-4-carboxamide (I) was articulated around the key intermediate 3-amino-1-[(3R,4S)-4-cyanotetrahydropyran-3-yl]pyrazole-4-carboxamide (See Compound (XVI) of Scheme 4 below). Due to the poor solubility of this intermediate in organic solvents, the chiral separation of the parent racemate (XV) had to be performed by chiral supercritical fluid chromatography (SFC). In addition, its further conversion to 1-[(3R,4S)-4-cyanotetrahydropyran-3-yl]-3-[(2-fluoro-6-methoxy-4-pyridyl)amino]pyrazole-4-carboxamide (I) was accompanied by the formation of a side product making the production of the pure final product more difficult.

WO 2013/041042 discloses pyrazole carboxamides as Janus kinase inhibitors that are useful for the treatment of rheumatoid arthritis, asthma, chronic obstructive pulmonary disease (COPD) and cancer. The compounds of this disclosure are of the following formula.

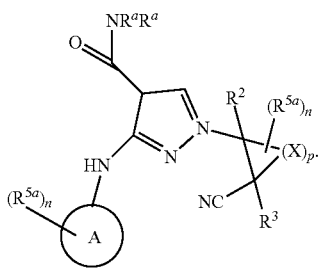

SUMMARY OF THE INVENTION

A process for making a compound of Formula (I)

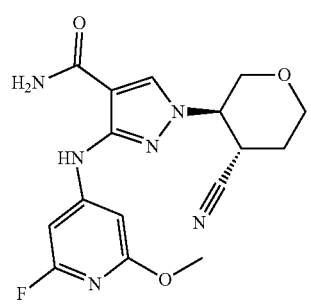

(I)

comprising
a. reacting a compound of Formula (VI)

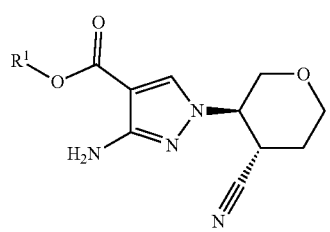

(VI)

wherein $R^1$ is $C_1$-$C_4$ alkyl, preferably $C_1$-$C_2$ alkyl, most preferably ethyl with a compound of Formula (XII)

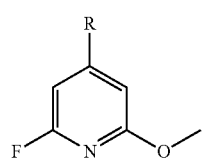

(XII)

in the presence of a catalyst and of a base wherein R is I or Br, to yield a compound of Formula (XIII)

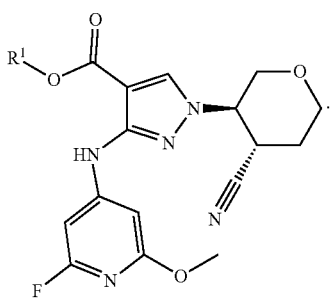

(XIII)

and
b. converting the compound of Formula (XIII) to the compound of Formula (I).
The process further comprising
a. reacting the compound of Formula (XIII) in the presence of a trialkylamine, preferably triethylamine with a lithium salt, preferably lithium bromide, lithium chloride or lithium hydroxide to yield a compound of Formula (XIV)

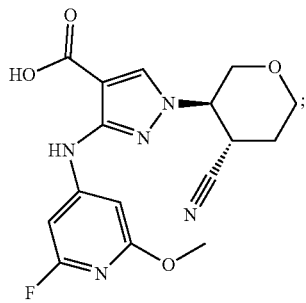

(XIV)

and
b. converting the compound of Formula (XIV) to the compound of Formula (I).

The process further comprising forming an active intermediate of the compound of Formula (XIV) and then reacting with ammonia or an equivalent thereof such as ammonium chloride associated to a base to yield the compound of Formula (I).

DETAILED DESCRIPTION

A new access to 1-[(3R,4S)-4-cyanotetrahydropyran-3-yl]-3-[(2-fluoro-6-methoxy-4-pyridyl)amino]pyrazole-4-carboxamide (I) was discovered. The principal novelties reside in (i) a novel more efficient synthesis of a bromo-pyridine intermediate (XIIb) disclosed in WO 2018/108969 (ii) the synthesis and use of a new iodo-pyridine building block (XIIa) (iii) the synthesis and use of a pyrazole ester intermediate (V) which can be obtained in enantiopure form (VI) by chiral separation and (iv) the new synthetic steps for the conversion of this advanced intermediate (VI) into 1-[(3R,4S)-4-cyanotetrahydropyran-3-yl]-3-[(2-fluoro-6-methoxy-4-pyridyl)amino]pyrazole-4-carboxamide (I). Unlike the known synthesis of 1-[(3R,4S)-4-cyanotetrahydropyran-3-yl]-3-[(2-fluoro-6-methoxy-4-pyridyl)amino]pyrazole-4-carboxamide (I), the novel synthetic sequence offers the potential to be scaled up at reasonable cost thus to be compatible with the production of large quantities of 1-[(3R,4S)-4-cyanotetrahydropyran-3-yl]-3-[(2-fluoro-6-methoxy-4-pyridyl)amino]pyrazole-4-carboxamide (I).

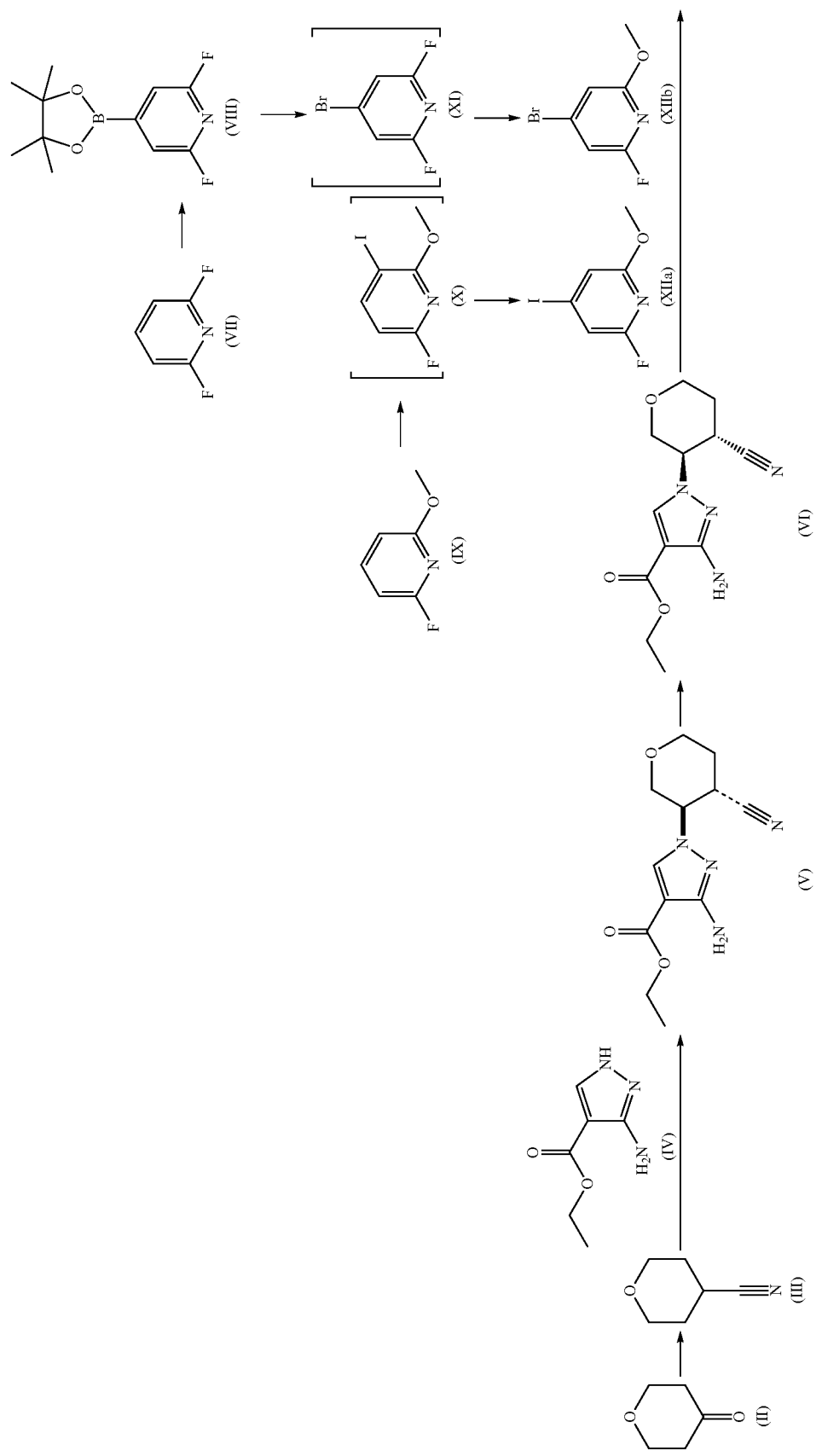
Scheme 1

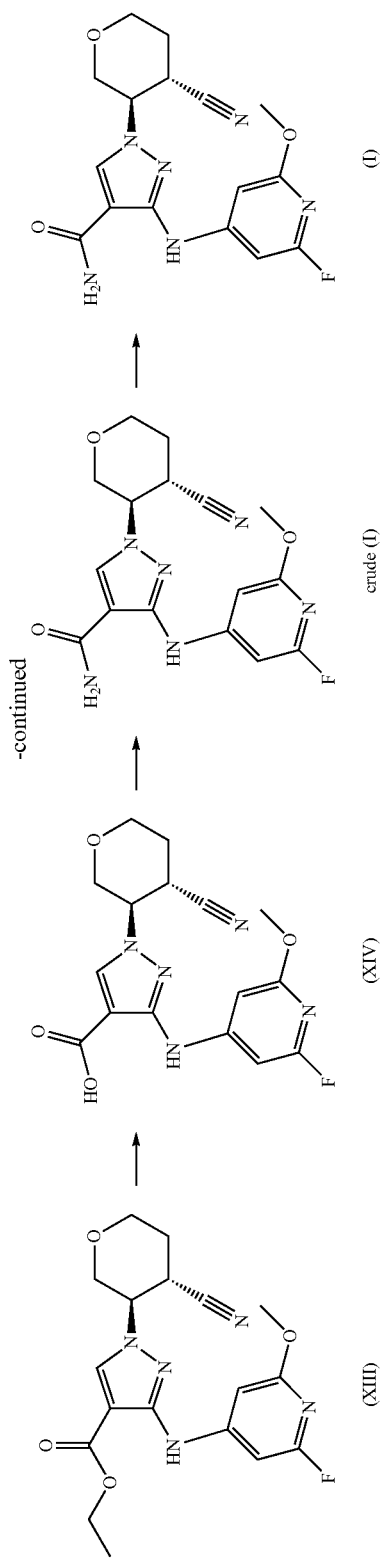

Descriptions of the preparation of key intermediates in the new synthesis are given below.

The synthesis of 2-fluoro-4-bromo-6-methoxy-pyridine (XIIb) disclosed in WO 2018/108969 was based on a four steps process starting from 3,5-dichloro-2,4,6-trifluoropyridine. Some synthetic steps composing this process proved unreliable and poor yielding. As illustrative drawbacks, the hydrodechlorination of 3,5-dichloro-2,4,6-trifluoropyridine into 2,4,6-trifluoropyridine (M. Schlosser et al. *Chem. Eur. J.* 2005, 11, 1903) could only be achieved in hydrophobic alcohols and suffered from partial hydrolysis of the product. In addition, the further conversion of the obtained 2,4,6-trifluoropyridine into 2,6-difluoro-4-hydrazinylpyridine was not regioselective. A novel more efficient two steps synthesis based on iridium (I)-catalyzed borylation of 2,6-difluoropyridine has been thus developed (scheme 2).

Scheme 2: Novel access to compound of formula (XIIb)

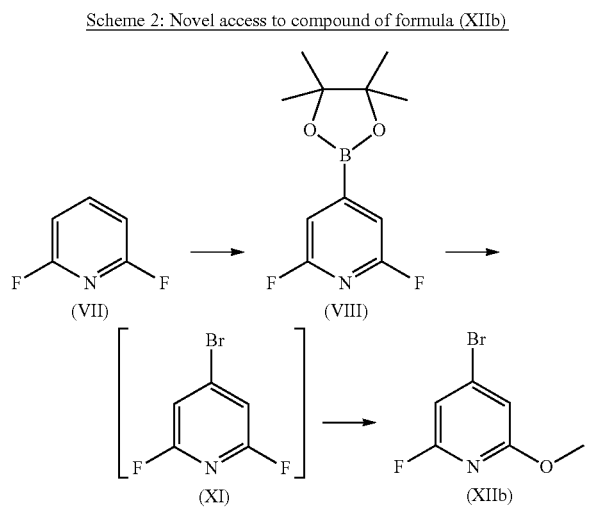

This process allows for the selective borylation of the position 4 of 2,6-difluoropyridine (VII) in good yield (65%). In one embodiment of the invention, the borylation step is performed in the presence of 4,4'-di-tert-butylbipyridine or of N-benzyl-1-phenyl-N-(2-pyridylmethyleneamino)methanamine as ligands. In a another embodiment of the invention, the borylation step is performed in an organic solvent such as tetrahydrofuran, cyclohexane or dioxane. Conversion of the obtained boronic ester (VIII) into the corresponding bromide (XI) is then achieved in the presence of a brominating agent. In an embodiment of the invention, the brominating agent is chosen from copper(I) bromide associated with an oxidazing agent or copper (II) bromide. In another embodiment of the invention, the brominating agent is copper (II) bromide. The introduction of the 6-methoxy substituent to deliver the target 2-fluoro-4-bromo-6-methoxy-pyridine (XIIb) is achieved in the presence of an alkali methoxide such as potassium or sodium methoxide. In one embodiment of the invention, the alkali methoxide is sodium methoxide.

As a cost efficient alternative to the newly developed synthesis of 2-fluoro-4-bromo-6-methoxy-pyridine (XIIb) is the synthesis and the use of 2-fluoro-4-iodo-6-methoxy-pyridine (XIIa) (scheme 3).

Scheme 3: Novel access to compound of formula (XIIa)

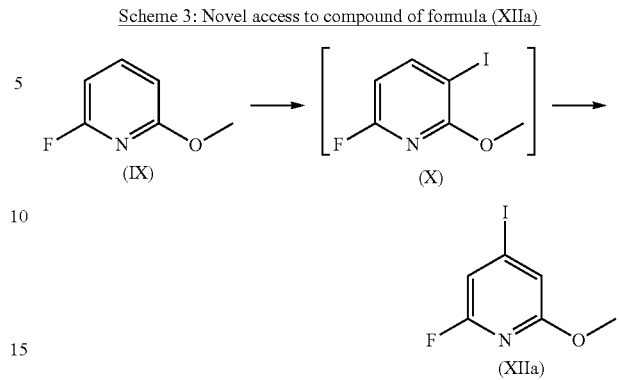

2-Fluoro-4-iodo-6-methoxy-pyridine (XIIa) is thus obtained in high purity and yield and in a single synthetic step from 2-fluoro-6-methoxy-pyridine (IX) via a novel halogenation/halogen dance protocol. In an embodiment of the invention, the halogenation/halogen dance step is performed in the presence of a lithium amide base. In a sub-aspect of the invention, the lithium amide base is chosen from lithium 2,2,6,6-tetramethylpiperidide and lithium diisopropylamide. In a further sub-aspect of the invention the lithium amide base is lithium 2,2,6,6-tetramethylpiperidide. In one part of the invention, the halogenation/halogen dance step is performed in the presence of 2 to 2.5 equivalent of lithium amide base. In a sub-part of the invention, the reaction is performed in the presence of 2 to 2.1 equivalent lithium amide base. In an embodiment of the invention, the halogenation/halogen dance reaction is performed at a temperature between −78 and −65° C. In a sub-embodiment of the invention, the reaction is performed between −75 and −70° C. In a further embodiment of the invention, the reaction is performed using 15 to 20 volumes of solvent.

The known synthesis of 1-[(3R,4S)-4-cyanotetrahydropyran-3-yl]-3-[(2-fluoro-6-methoxy-4-pyridyl)amino]pyrazole-4-carboxamide (I) was articulated around the key intermediate 3-amino-1-[(3R,4S)-4-cyanotetrahydropyran-3-yl] pyrazole-4-carboxamide (XVI) (WO2018/108969) (See Scheme 4). Due to the poor solubility of this intermediate in organic solvents, the chiral separation of the parent racemate (XV) had to be performed by chiral supercritical fluid chromatography (SFC). In addition, its further conversion to 1-[(3R,4S)-4-cyanotetrahydropyran-3-yl]-3-[(2-fluoro-6-methoxy-4-pyridyl)amino]pyrazole-4-carboxamide (I) was accompanied by the formation of a side product resulting from the presence of a reactive amide group.

Scheme 4

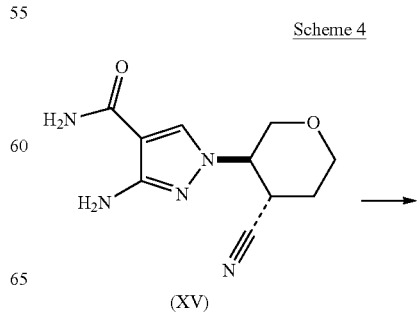

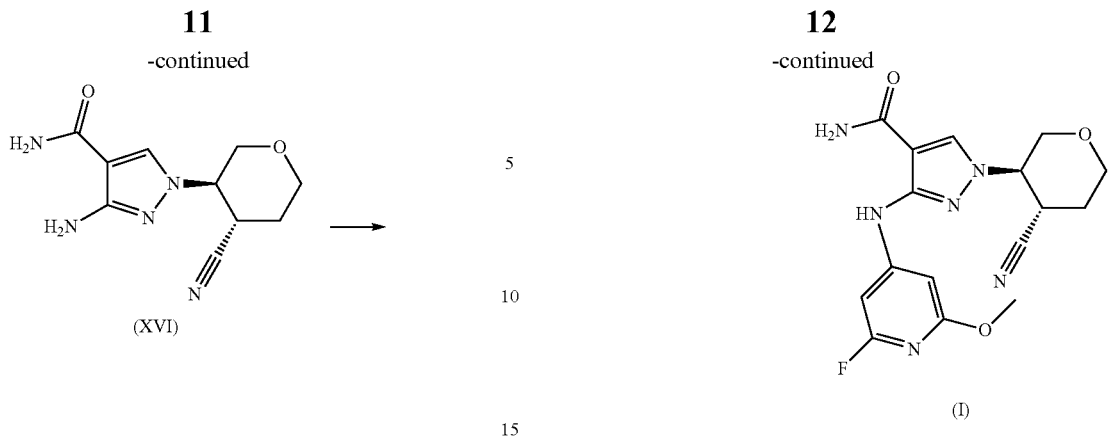

It was discovered that 1-[(3R,4S)-4-cyanotetrahydropyran-3-yl]-3-[(2-fluoro-6-methoxy-4-pyridyl)amino]pyrazole-4-carboxamide (I) can be more conveniently prepared from ethyl 3-amino-1-[(3R,4S)-4-cyanotetrahydropyran-3-yl]pyrazole-4-carboxylate (VI) which can be obtained from ethyl 3-amino-1H-pyrazole-4-carboxylate (IV) via a new synthesis (scheme 5).

This new intermediate (V) offers the advantages over the parent amide (XV) to be much more soluble in organic solvents and to be amenable to clean conversion into 1-[(3R,4S)-4-cyanotetrahydropyran-3-yl]-3-[(2-fluoro-6-methoxy-4-pyridyl)amino]pyrazole-4-carboxamide (I). Due to the higher solubility in organic solvents a new scalable and much more cost efficient chiral separation of the racemate (V) is achieved.

Ethyl 3-amino-1-[(3R,4S)-4-cyanotetrahydropyran-3-yl]pyrazole-4-carboxylate (VI) is prepared by the reaction of ethyl 3-amino-1H-pyrazole-4-carboxylate (IV) with 3,6-dihydro-2H-pyran-4-carbonitrile (III) in the presence of a base in an organic solvent at elevated temperature, followed by chiral separation (scheme 6).

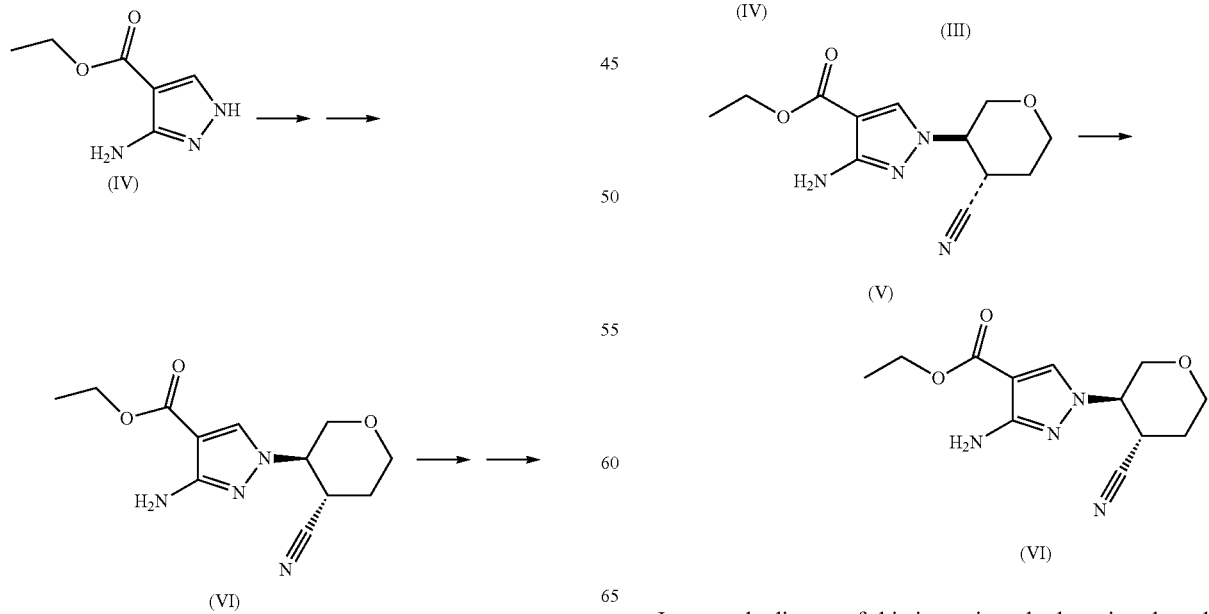

In an embodiment of this invention, the base is selected from 1,8-diazabicyclo[5.4.0]undec-7-ene, potassium carbonate, potassium phosphate tribasic. In another embodiment of this invention, the base is potassium carbonate or potassium phosphate tribasic.

In an embodiment of this invention, the organic solvent is ethanol, 1,4-dioxane, N,N-dimethylformamide, toluene or acetonitrile. In a sub-aspect of this invention, the organic solvent is either toluene or acetonitrile. In an embodiment of this invention, 1 to 2.5 equivalents of 3,6-dihydro-2H-pyran-4-carbonitrile (III) are engaged in the reaction. In another embodiment of the invention, 1.1 to 1.5 equivalents of 3,6-dihydro-2H-pyran-4-carbonitrile (III) are engaged in the reaction The coupling step between either 2-fluoro-4-bromo-6-methoxy-pyridine (XIIb) or 2-fluoro-4-iodo-6-methoxy-pyridine (XIIa) and the compound of formula (VI) is achieved in the presence of a palladium catalyst and of a ligand (scheme 7).

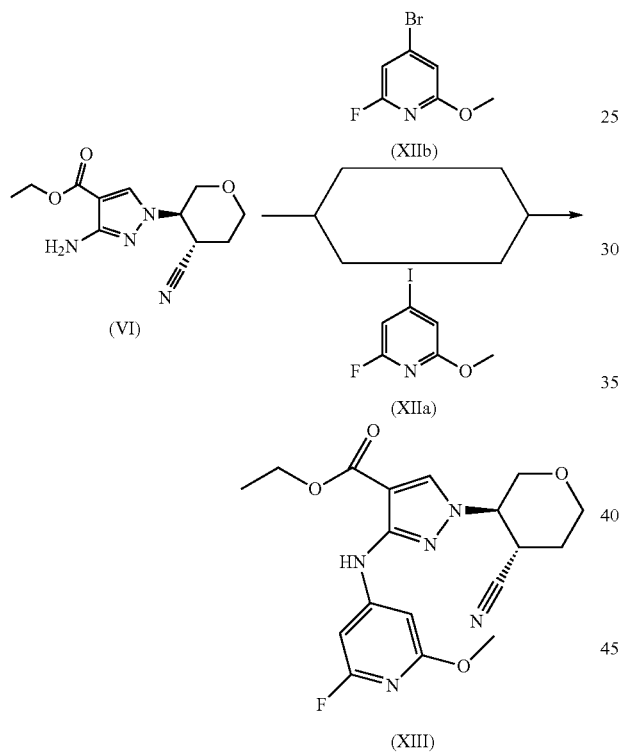

Scheme 7 Preparation of compound of formula (XIII)

In one embodiment of the invention, the palladium catalyst is chosen from tris(dibenzylideneacetone) dipalladium (0), allylpalladium(II) chloride dimer, [(2-di-tert-butylphosphino-3,6-dimethoxy-2',4',6'-triisopropyl-1,1'-biphenyl)-2-(2'-amino-1,1'-biphenyl)]palladium(II) methanesulfonate and palladium(II) acetate and the ligand is selected from 2-(di-tert-butylphosphino)-2',4',6'-triisopropyl-3,6-dimethoxy-1,1'-biphenyl, 2-di-tert-butylphosphino-2',4',6'-triisopropylbiphenyl and 4,5-bis(diphenylphosphino)-9,9-dimethylxanthene. In a part of the invention, the palladium catalyzed coupling step is performed in the presence of a base such as potassium acetate or potassium phosphate tribasic.

The hydrolysis of the obtained ester of formula (XIII) into the corresponding acid of formula (XIV) (scheme 8) is performed in the presence of a lithium salt, of a trialkylamine and of a catalytic amount of water.

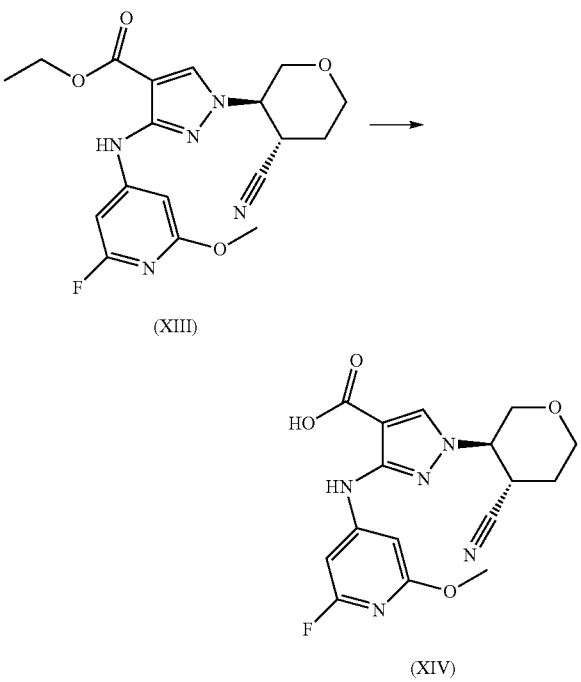

Scheme 8: Preparation of compound of formula (XIV)

In an embodiment of the invention, the lithium salt is lithium bromide, lithium chloride or lithium hydroxide. In another embodiment of the invention, the lithium salt is either lithium bromide or lithium hydroxide. In a further embodiment of the invention, the trialkylamine base is triethylamine. In another embodiment of the invention, the hydrolysis is performed at elevated temperature. In an additional embodiment of the invention, the hydrolysis is performed at a temperature between 60 and 100° C. In a further embodiment of the invention, the hydrolysis is performed at a temperature between 65 and 85° C.

The conversion of the penultimate acid (XIV) into 1-[(3R,4S)-4-cyanotetrahydropyran-3-yl]-3-[(2-fluoro-6-methoxy-4-pyridyl)amino]pyrazole-4-carboxamide (I) is achieved by converting the acid of formula (XIV) into an active intermediate and by reacting this intermediate with ammonia or a synthetic equivalent thereof (scheme 9).

Scheme 9: Conversion of the intermediate of formula (XIV) into compound (I)

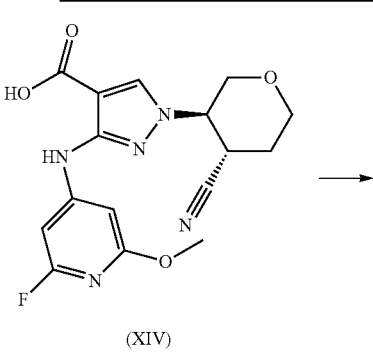

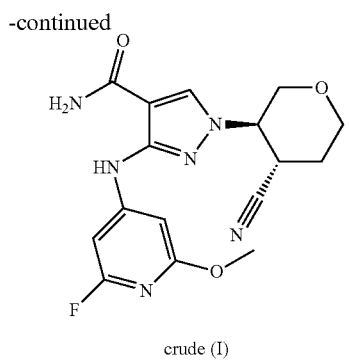

crude (I)

In an embodiment of the invention, the active intermediate is an acid chloride derived from the acid of formula (XIV) and is obtained by the reaction of the acid (XIV) with a chlorinating agent such as oxalyl chloride or thionyl chloride. In a another embodiment of the invention, the active intermediate results from the reaction of the acid of formula (XIV) with a coupling reagent such as a carbodiimide (DCC, DIC, EDC. HCl), a O-(benzotriazol-1-yl)-N,N,N',N'-tetramethyluronium salt (HBTU, TBTU), a O-(7-azabenzotriazol-1-yl)-N,N,N',N'-tetramethyluronium salt (HATU, TATU) reagent optionally in the presence of an additive such as hydroxybenzotriazole or ethyl cyano(hydroxyimino)acetate.

Definitions

Lithium tetramethylpiperidide (CAS no. 38227-87-1) (often abbreviated LiTMP, Li/TMP or LTMP) is a chemical compound with the molecular formula $C_9H_{18}LiN$. It is used as a non-nucleophilic base.

Trimethylsilyl cyanide (CAS no. 7677-24-9) (TMSCN) is the chemical compound with the formula $(CH_3)_3SiCN$. This volatile liquid consists of a cyanide group, that is CN, attached to a trimethylsilyl group. The molecule is used in organic synthesis as the equivalent of hydrogen cyanide.

1,5-Cyclooctadiene (CAS n° 1552-12-1) often abbreviated COD is a chemical compound used as a ligand in numerous metal complexes.

Pinacol (CAS n° 76-09-5) usually abbreviated pin is often a structural component of boron esters that are engaged in organometallic coupling processes.

MTBE stands for methyl tert-butyl ether (CAS n° 1634-04-4) and is used as organic solvent.

Dibenzylideneacetone (CAS n° 35225-79-7) often abbreviated dba is a chemical compound used as a ligand in numerous metal complexes.

2-Di-tert-butylphosphino-2',4',6'-triisopropylbiphenyl (CAS n° 564483-19-8) often abbreviated t-Bu Xphos or tert-Butyl Xphos is a chemical compound used as a ligand in numerous metal complexes.

4,5-Bis(diphenylphosphino)-9,9-dimethylxanthene (CAS n° 161265-03-8) usually abbreviated Xantphos is a chemical compound used as a ligand in numerous metal complexes.

1,3-Dicyclohexylcarbodiimide (CAS n° 538-75-0) often abbreviated DCC, 1,3-diisopropylcarbodiimide (CAS n° 693-13-0) often abbreviated DIC and 1-ethyl-3-(3'-dimethylaminopropyl)carbodiimide hydrochloride (CAS n° 25952-53-8) usually abbreviated EDC.HCl are reagents used for converting carboxylic acids into the corresponding O-acylurea intermediates which are prompt to reactions with a variety of nucleophiles.

O-(Benzotriazol-1-yl)-N,N,N',N'-tetramethyluronium hexafluorophosphate (CAS no. 94790-37-1) often abbreviated HBTU and O-(Benzotriazol-1-yl)-N,N,N',N'-tetramethyluronium tetrafluoroborate (CAS n° 125700-67-6) often abbreviated TBTU are reagents used for converting carboxylic acids into the corresponding 1-hydroxybenzotriazole esters which are prompt to reactions with a variety of nucleophiles.

O-(7-Azabenzotriazol-1-yl)-N,N,N',N'-tetramethyluronium hexafluorophosphate (CAS n° 148893-10-1) often abbreviated HATU and O-(7-Azabenzotriazol-1-yl)-N,N,N',N'-tetramethyluronium tetrafluoroborate (CAS n° 873798-09-5) are reagents used for converting carboxylic acids into the corresponding 1-hydroxyazabenzotriazole esters which are prompt to reactions with a variety of nucleophiles.

An ammonia equivalent is a synthetic equivalent of ammonia, for example ammonium chloride.

A brominating agent is a reagent used to introduce bromine into the reaction, for example copper (II) bromide or copper (I) bromide associated to an oxidant.

An embodiment of the invention is a process for making a compound of Formula (XII),

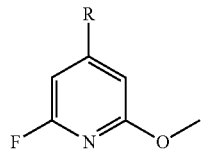

(XII)

wherein R is I,
comprising
reacting a compound of Formula (IX)

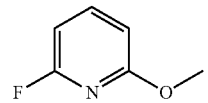

(IX)

with iodine and a lithium amide base, preferably lithium/TMP, to yield a compound of Formula (X)

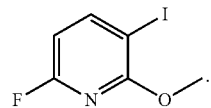

(X)

In an embodiment, the process further comprises reacting the compound of Formula (X) in the presence of a lithium amide base, preferably lithium/TMP, to yield a compound of Formula (XII)a

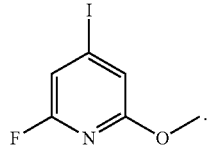

(XIIa)

In an alternative embodiment, the product of step a) is not isolated and purified before being carried on to step b.

An embodiment of the invention is a process for making a compound of Formula (XII),

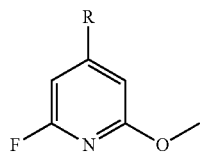

(XII)

wherein R is Br, comprising reacting a compound of Formula (VII)

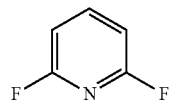

(VII)

with an iridium catalyst and bis(pinacolato)diboron to yield a compound of Formula (VIII)

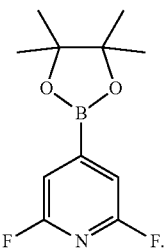

(VIII)

In an embodiment, the process further comprises reacting the compound of Formula (VIII) with a brominating agent, preferably copper (II) bromide or copper (I) bromide associated to an oxidant, preferably copper (II) bromide, to yield a compound of Formula (XI)

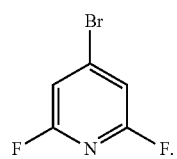

(XI)

In an embodiment, the process further comprises reacting the compound of Formula (XI) with an alkali methoxide, preferably sodium methoxide or potassium methoxide to yield a compound of Formula (XIIb)

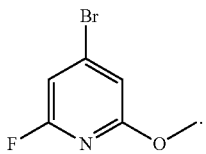

(XIIb)

An embodiment of the invention is a process for making a compound of Formula (VI)

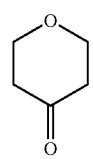

(VI)

wherein $R^1$ is $C_1$-$C_4$ alkyl, preferably $C_1$-$C_2$ alkyl, most preferably ethyl comprising
reacting a compound of Formula (II)

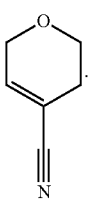

(II)

with
 i. Hydrogen cyanide or an equivalent thereof such as TMSCN and
 ii. $POCl_3$ or $SOCl_2$
to yield a compound of Formula (III)

(III)

In an embodiment, the process further comprises reacting the compound of Formula (III) with a compound of Formula (IV) in the presence of a base such as potassium phosphate tribasic or potassium acetate

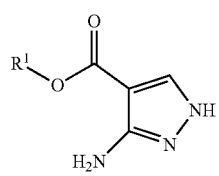

(IV)

wherein $R^1$ is $C_1$-$C_4$ alkyl, preferably $C_1$-$C_2$ alkyl, most preferably ethyl to yield a compound of Formula (V)

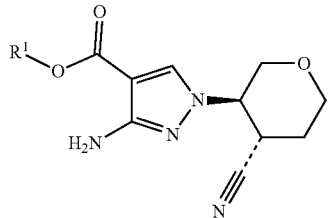

(V)

wherein $R^1$ is $C_1$-$C_4$ alkyl, preferably $C_1$-$C_2$ alkyl, most preferably ethyl.

In an embodiment, the process further comprises separating the enantiomers of the compound of Formula (V) to give the compound of Formula (VI).

In an embodiment, the separation of enantiomers is achieved by chiral chromatography.

An embodiment of the invention is a compound of Formula (V)

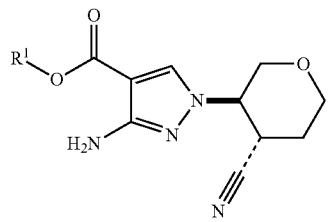

(V)

wherein $R^1$ is $C_1$-$C_4$ alkyl, preferably $C_1$-$C_2$ alkyl, most preferably ethyl.

An embodiment of the invention is the compound of Formula (VI)

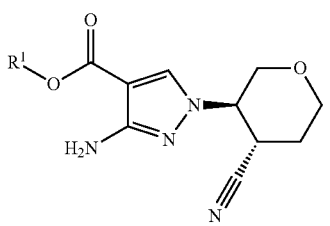

(VI)

wherein $R^1$ is $C_1$-$C_4$ alkyl, preferably $C_1$-$C_2$ alkyl, most preferably ethyl.

An embodiment of the invention is a compound of Formula (XIII)

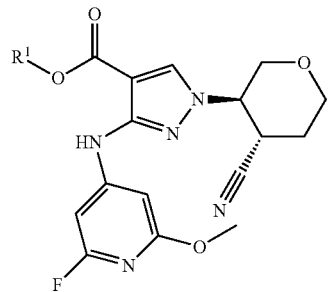

(XIII)

wherein $R^1$ is $C_1$-$C_4$ alkyl, preferably $C_1$-$C_2$ alkyl, most preferably ethyl.

An embodiment of the invention is a compound of Formula (XIV)

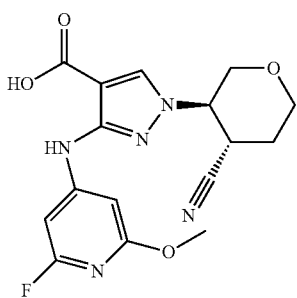

(XIV)

An additional embodiment of the invention is a process to make the compound of Formula (I)

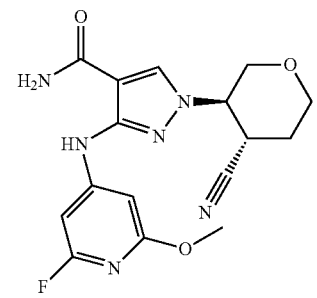

(I)

comprising reacting the compound of Formula (XVI)

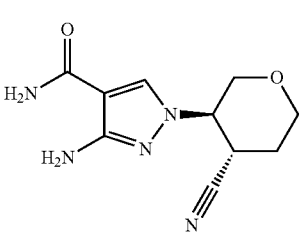

(XVI)

with the compound of Formula (XIIa)

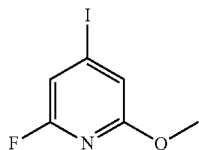

(XIIa)

to yield the compound of Formula (I)
HPLC Methods:
Method A
Agilent Technologies UHPLC/MSD 6130 B Series 1290 composed of
Binary pump G7120A included degasser
Well plate sampler G4226A
Column oven G1316B
Diode array detector G4212A
Mass detector G6130B Quadrupole LC/MS with ESI-source
Column: Waters XP, 2.1×50 mm Xbridge BEH C18 2.5μ, T=40° C.;
Eluents: A: acetonitrile with 0.05% (vol./vol.) formic acid.
B: water with 0.05% formic acid (vol./vol.);
Flow: 0.8 mL/min;
Gradient: from 2 to 100% eluent A 1.2 min, 0.5 min 100% eluent A;
Run time: 2.2 min;
Detection: ESI/MS, positive and negative ions scan: 100-1000 m/z;
UV at 254 and 210 nm;
Method B
Agilent Technologies UHPLC/MS 1260 Series composed of:
Binary pump G7120A included degasser
Well plate sampler G4226A
Column oven G7116B
Diode array detector G7117B
Mass detector G6150B Quadrupole LC/MS with ESI-jetstream-source
Column: Waters XP, 2.1×50 mm Xbridge BEH C18 2.5μ, T=40° C.;
Eluents: A: acetonitrile with 0.05% (vol./vol.) formic acid.
B: water with 0.05% formic acid (vol./vol.);
Flow: 0.8 mL/min;
Gradient: from 2 to 100% eluent A 1.2 min, 0.5 min 100% eluent A;
Run time: 2.2 min;
Detection: ESI/MS, positive and negative ions scan: 100-1000 m/z;
UV at 254 and 210 nm;
Method C
Agilent Technologies UHPLC/MS 1260 Series composed of:
Binary pump G4220A included degasser
Well plate sampler G4226A
Column oven G7116B
Diode array detector G4212A
Mass detector G6130B Quadrupole LC/MS with ESI/APCI-multi mode source
Column: Waters XP, 2.1×50 mm Xbridge BEH C18 2.5μ, T=40° C.;
Eluents: A: acetonitrile with 0.05% (vol./vol.) formic acid.
B: water with 0.05% formic acid (vol./vol.);
Flow: 0.8 mL/min;
Gradient: from 2 to 100% eluent A 1.2 min, 0.5 min 100% eluent A;
Run time: 2.2 min;
Detection: ESI/MS, positive and negative ions scan: 100-1000 m/z;
UV at 254 and 210 nm;

Examples

Synthesis of ethyl 3-amino-1-[(trans)-4-cyanotetrahydropyran-3-yl]pyrazole-4-carboxylate (III)

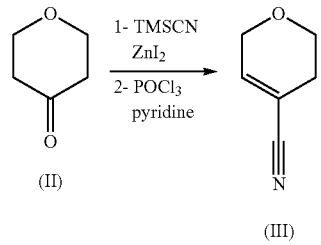

A jacketed glass reactor (10 L) equipped with a reflux condenser, a mechanical stirred, an internal thermometer, a gas scrubber and placed under nitrogen atmosphere is charged with dry acetonitrile (2.55 L) and with dihydro-2H-pyran-4(3H)-one (II) (365 g, 3.65 mol). The resulting mixture is stirred and the temperature is adjusted between −5 and 0° C. Zinc iodide (35 g, 0.11 mol) is added to the solution while maintaining the temperature below 10° C. After the temperature is adjusted between −5 and 0° C., trimethylsilanecarbonitrile (433 mL, 3.46 mol) is added dropwise over 80 min while keeping the temperature below 0° C. After 3 h reaction time at 0° C. complete conversion of the starting material is observed and pyridine (1.76 L, 21.9 mol) followed by phosphoryl chloride (510 mL; 5.47 mol) are added to the reaction mixture. The temperature is raised to 80° C. and the reaction mixture is stirred at this temperature for 16 h. The reaction mixture is then cooled to room temperature and is added to a solution of iron sulfate hepta hydrate (304 g, 1.09 mol) in water (7.3 L) adjusted to pH>10 by the addition of aqueous 50% sodium hydroxide. During the addition of the reaction mixture to the basic iron sulfate solution, the temperature is maintained below 20° C. and the pH is kept above 10 by the addition of aqueous 50% sodium hydroxide. The resulting mixture is extracted with methyl-tert-butyl ether (3.5 L), the organic phase is collected and the aqueous phase is diluted with water (6 L). The diluted aqueous phase is extracted with methyl-tert-butyl ether (2×2.5 L). The combined organic layers are washed with aqueous saturated sodium hydrogencarbonate (1.83 L) and are concentrated under reduced pressure at 40° C. Distillation of the crude residue under reduced pressure (bp ~45° C. at 0.5 mbar) affords the desired product (III) as colorless oil (289 g, 2.6 mol).
HPLC Method A: Ret. Time: 0.58 min; m/z 110
$^1$H NMR (300 MHz, CDCl$_3$) δ (ppm): 6.60-6.57 (1H, m); 4.21-4.18 (2H, m); 3.75 (2H, J=5.52 Hz, t); 2.31-2.25 (2H, m)

Synthesis of 2,6-difluoro-4-(4,4,5,5-tetramethyl-1,3,2-dioxaborolan-2-yl)pyridine (VIII)

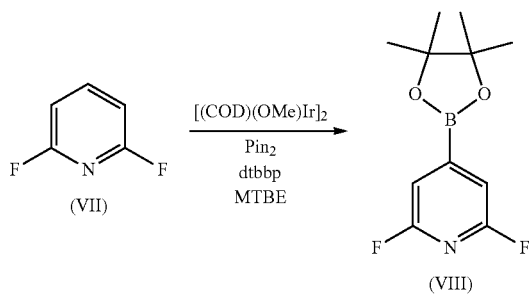

Bis(pinacolato)diboron (68.8 g, 0.27 mol); 4,4'-di-tert-butyl bipyridine (2.10 g, 7.82 mmol) and (1,5-cyclooctadiene)(methoxy) iridium (I) dimer (2.59 g, 3.91 mmol) were suspended in methyl-tert-butylether (10 mL) under inert atmosphere and 2,6-difluoropyridine(VII) (23.8 mL, 0.26 mol) was added. The temperature was slowly raised to 45° C. and the reaction mixture was stirred at this temperature for 5 h. The reaction mixture was then allowed to cool down to room temperature and was concentrated under reduced pressure. The isolated residue was purified by filtration over a short silica gel column using pentane as eluent to deliver the desired product (VIII) as colorless solid (32.7 g, 0.14 mol).

HPLC Method A: Ret. Time: 0.68 min; m/z 581
NMR (300 MHz, CDCl$_3$) δ (ppm): 7.08 (2H, m); 1.28 (12H, s)

Synthesis of 4-bromo-2-fluoro-6-methoxy-pyridine (XIIb)

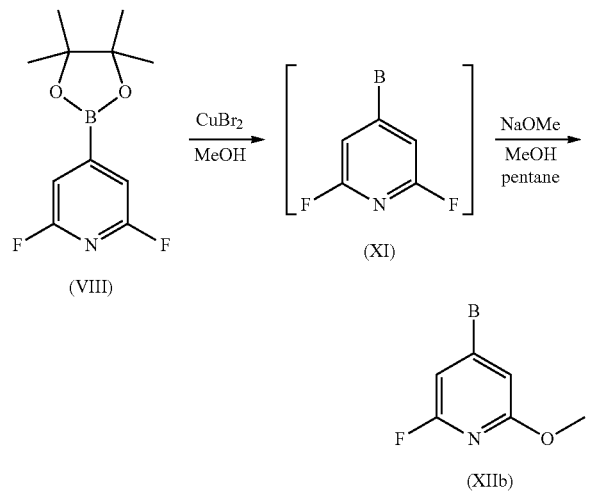

2,6-Difluoro-4-(4,4,5,5-tetramethyl-1,3,2-dioxaborolan-2-yl)pyridine (VIII) (32 g, 133 mmol) was dissolved in methanol (380 mL) and a 1.1 M aqueous solution of copper(II) bromide (104 g, 465 mmol) was added. The resulting mixture was heated to reflux and was stirred at this temperature for 90 min. The heating was stopped and the reaction mixture was cooled to 0° C. with an ice bath before a 10% aqueous ammonium hydroxide (300 mL) solution was added dropwise under stirring. The resulting mixture was extracted with pentane (3×200 mL) and the solution of desired product (XI) in pentane was directly engaged in the next step. Dry methanol (160 mL) was added to the solution of 4-bromo-2-fluoro-6-methoxy-pyridine (XI) in pentane and a solution of sodium methoxide (100 mmol) in dry methanol (88.4 mL) was added at about 20° C. under stirring. After 2.5 h reaction time, the mixture was cooled to 0° C. by application of an ice bath and the mixture was poured into a stirred mixture of 2 N aqueous hydrochloric acid (224 mL) and ice (224 g). After separation of the organic phase, the aqueous phase was extracted with pentane (100 mL). The combined organic layers were washed with brine (50 mL) and concentrated under reduced pressure (700 to 750 mbar) at about 38° C. The desired product (XIIb) was obtained as light yellow solid (21.5 g, 92 mmol) in the presence of residual pentane (11% wt.).

HPLC Method A: Ret. Time: 1.11 min
NMR (300 MHz, CDCl$_3$) δ (ppm): 6.82 (1H, m); 6.68-6.67 (1H, m); 3.93 (3H, s)

Synthesis of 2-fluoro-6-methoxy-4-iodo-pyridine (XIIa)

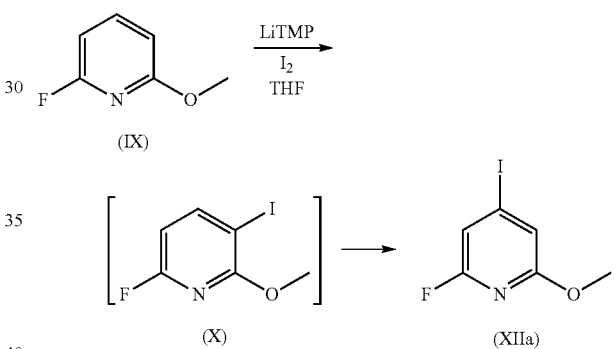

A dried flask (20 L) under inert atmosphere was charged with dry tetrahydrofuran (5.99 L) at 15° C. 2,2,6,6-Tetramethylpiperidine (1161 g, 8.22 mol) was added and the resulting solution was cooled to −30° C. A solution of n-BuLi in hexanes (2292 mL, 7.47 mol) was added dropwise in 30 min while maintaining the temperature at about −30° C. The resulting mixture was stirred at this temperature for 1 h. The mixture was then lowered to −75 to −70° C. and a solution of 2-fluoro-6-methoxy-pyridine (IX) (500 g, 3.93 mol) in dry tetrahydrofuran (1496 mL) was added in 30 min while keeping the temperature at −75 to −70° C. The reaction mixture was stirred for 90 min at this temperature before a solution of iodine (998.4 g, 3.93 mol) in dry tetrahydrofuran (2494 mL) was added within 1 h at −75 to −70° C. The mixture was stirred between −75 to −70° C. for 14 h. Water (3.5 L) was added at −75 to −70° C. within 30 min and the reaction mixture was allowed to reach room temperature. The organic layer was separated and the aqueous phase was extracted with methyl-tert-butyl ether (2×2.5 L). The combined organic layers were washed with 85% wt. aqueous phosphoric acid (2×4 L) and concentrated at a temperature not exceeding 30° C. for 4 h to a total weight of 1250 g. After steam distillation at 102° C. and separation of the aqueous layer, a colorless oil was obtained. Heptane (390 mL) was added to the isolated oil and the resulting mixture was stirred between −10 to −5° C. for 30 min. The formed solid was collected by filtration and was washed with a small volume of pre cooled heptane (about 55 mL) to afford the desired product (XIIa) (530 g, 2.09 mol).

HPLC Method A: Ret. Time: 1.14 min $^1$H NMR (300 MHz, CDCl$_3$) δ (ppm): 7.03 (1H, m); 6.88-6.86 (1H, m); 3.93 (3H, s)

Synthesis of Ethyl 3-amino-1-[(trans)-4-cyanotetrahydropyran-3-yl]pyrazole-4-carboxylate (V)

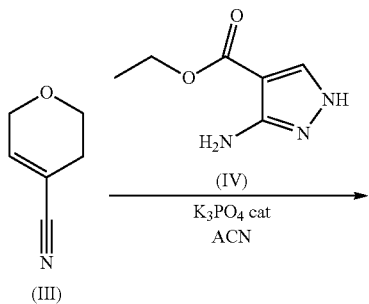

A jacketed glass reactor (5 L) equipped with a reflux condenser, a mechanical stirrer, an internal thermometer and placed under nitrogen atmosphere was charged with dry acetonitrile (750 mL), potassium phosphate tribasic monohydrate (38.3 g, 0.16 mol) and ethyl 3-amino-1H-pyrazole-4-carboxylate (IV) (500 g, 3.19 mol). The resulting mixture was heated to 80° C. and 3,6-dihydro-2H-pyran-4-carbonitrile (III) (462 g, 4.15 mol) was quickly added via an addition funnel. The addition funnel was rinsed with acetonitrile (250 mL) which was also added to the reaction mixture. The reaction mixture was reacted for 6.5 h at 80° C. under vigorous stirring before heating was stopped and the reaction mixture further stirred overnight. After concentration of the reaction mixture under reduced pressure a yellow slurry was obtained. The obtained material was diluted with ethyl acetate (5 L) and the resulting solution was extracted with aqueous 1M hydrochloric acid (3×1.5 L) was washed once with brine (1 L), was filtered over a filter filled with a pad of magnesium sulfate and was concentrated under reduced pressure to afford a yellow oil. The yellow oil was taken up in methanol (1.36 L), the resulting mixture was warmed up to 40° C. under stirring to ensure homogenization. The solution was then cooled to 25° C. and was seeded at this temperature with 2.0 g pure seeds before being gently stirred at −20° C. overnight. The precipitate formed was filtered off, was washed with pre chilled methanol (1 L) and was dried under reduced pressure at 40° C. to give an off-white solid. The isolated white solid was heated to reflux in 2-propanol (1 L) for 1 h and the mixture was slowly allowed to reach room temperature under gentle stirring overnight. The precipitate formed was filtered off, was washed with 2-propanol (300 mL) and was dried under reduced pressure at 40° C. to afford the desired product (V) as off-white solid (347.2 g, 1.20 mol).

HPLC Method A: Ret. Time: 0.75 min; m/z 265

$^1$H NMR (600 MHz, CDCl$_3$) δ (ppm): 7.82 (s, 1H); 4.28 (2H, J=7.1 Hz, q); 4.14 (1H, J=4.3, 9.0 Hz, dt); 4.08 (1H, J=4.2, 12.0 Hz, dd); 4.00 (1H, J=4.0, 12.1 Hz, td); 3.90 (1H, J=8.7, 12.0 Hz, dd); 3.55-3.50 (1H, m); 3.62-3.44 (2H, m); 2.20-2.10 (1H, m); 2.06-1.94 (1H, m); 1.34 (3H, J=7.1 Hz, t)

Chiral Separation of Ethyl 3-amino-1-[(trans)-4-cyanotetrahydropyran-3-yl]pyrazole-4-carboxylate (V) to ethyl 3-amino-1-[(3S,4R)-4-cyanotetrahydro-2H-pyran-3-yl]-1H-pyrazole-4-carboxylate (VI)

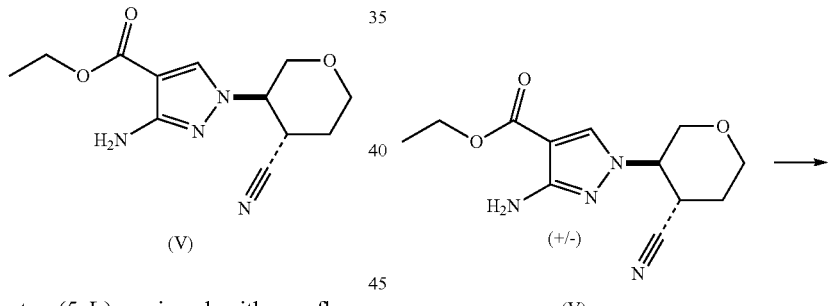

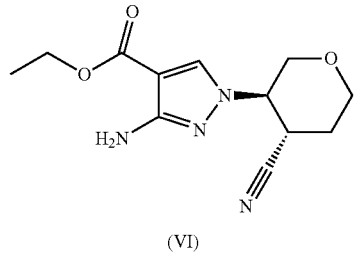

Separation of the mixture of enantiomers (V) to the single enantiomer (VI) was achieved by chiral chromatography.

Synthesis of Ethyl 1-[(3R,4S)-4-cyanotetrahydropyran-3-yl]-3-[(2-fluoro-6-methoxy-4-pyridyl)amino]pyrazole-4-carboxylate (XIII)

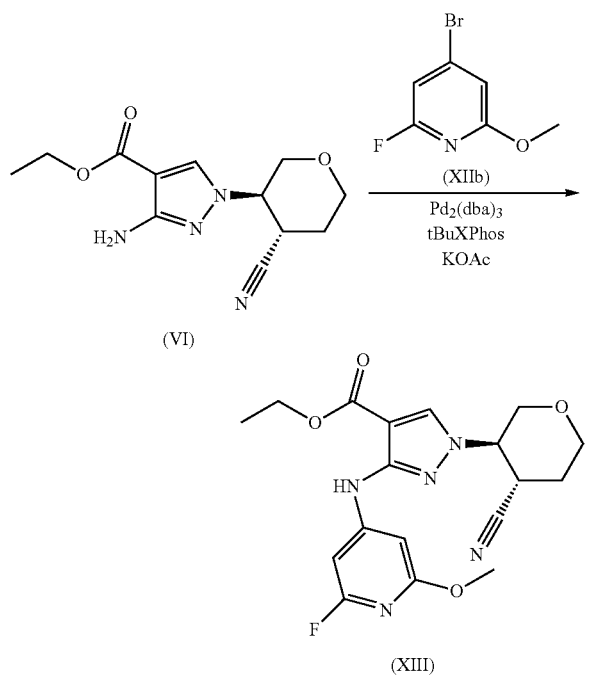

Ethyl 3-amino-1-[(3S,4R)-4-cyanotetrahydro-2H-pyran-3-yl]-1H-pyrazole-4-carboxylate (VI) (50 g, 189 mmol), 4-bromo-2-fluoro-6-methoxy-pyridine (XIIb) (39 g, 189 mmol), tris(dibenzylideneacetone) dipalladium(0) (3.57 g, 3.8 mmol), 2-di-tert-butylphosphino-2',4',6'-triisopropylbiphenyl (3.21 g, 7.6 mmol) and potassium acetate (37.1 g, 378 mmol) were placed under inert atmosphere and 2-propanol (600 mL) was added. The resulting mixture was heated to 65° C. and stirred at this temperature for 90 min. After cooling to room temperature, the mixture was concentrated under reduced pressure at 40° C. The obtained crude residue was stirred with acetonitrile (650 mL) for 30 min at 50° C. The hot solution was filtered over a pad of Celite and the filtrate was concentrated under reduced pressure. The obtained residue was taken up in 2-propanol (750 mL), the resulting mixture was warmed to 100° C. and was then allowed to slowly reach room temperature under gentle stirring. The formed precipitate was filtered off, the wet cake was rinsed with 2-propanol (50 mL) and was then dried under reduced pressure at 40° C. to afford the desired product (XIII) (61.2 g, 149 mmol). Concentration of the filtrate combined with the 2-propanol rinse under reduced pressure, afforded a solid. The new formed solid was washed with 2-propanol (2×50 mL) and was dried under reduced pressure at 40° C. to afford a second crop of desired product (XIII) (8.2 g, 19.5 mmol).

HPLC Method B: Ret. Time: 1.10 min; m/z 390

$^1$H NMR (600 MHz, CDCl$_3$) δ (ppm): 8.61 (1H, s); 7.95 (1H, s); 6.73 (1H, s); 6.68 (1H, J=1.5 Hz, d); 4.33 (2H, J=7.1 Hz, q); 4.25 (1H, J=4.2, 9.0 Hz, dt); 4.16 (1H, J=4.2, 12.0 Hz, dd); 4.06 (1H, J=4.0, 12.1 Hz, td); 3.98 (1H, J=8.8, 12.1 Hz, dd); 3.92 (3H, s); 3.70-3.62 (1H, m); 3.61-3.52 (1H, m); 2.25-2.15 (1H, m); 2.06 (1H, J=4.2, 10.3, 14.2 Hz, dtd); 1.38 (3H, J=7.1 Hz, t)

Synthesis of Ethyl 1-[(3R,4S)-4-cyanotetrahydropyran-3-yl]-3-[(2-fluoro-6-methoxy-4-pyridyl)amino]pyrazole-4-carboxylate (XIII)

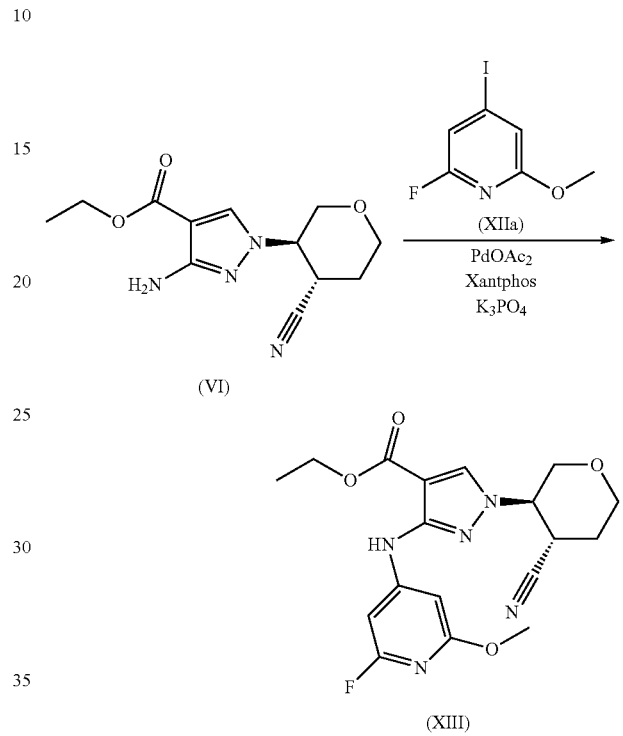

Ethyl 3-amino-1-[(3S,4R)-4-cyanotetrahydro-2H-pyran-3-yl]-1H-pyrazole-4-carboxylate (VI) (1 g, 3.78 mmol), 2-fluoro-4-iodo-6-methoxypyridine (XIIa) (1.15 g, 4.54 mmol), palladium diacetate (21 mg, 0.095 mmol), 4,5-bis(diphenylphosphino)-9,9-dimethylxanthene (109 mg, 0.19 mmol) and potassium phosphate tribasic (2.41 g, 11.35 mmol) were placed under nitrogen atmosphere and 1,4-dioxane (10 mL) is added. The resulting mixture was heated to 60° C. and stirred at this temperature for 18 h. After cooling to room temperature, the mixture was concentrated under reduced pressure. The obtained residue was diluted with 2-propanol (20 mL) and the resulting mixture was warmed up until a solution was obtained. Heating was stopped and the solution was allowed to slowly reach room temperature. The suspension was filtered to collect the formed precipitate. The wet cake is rinsed with 2-propanol (25 mL) and was dried under reduced pressure at 40° C. to afford the desired product (XIII) as off-white solid (1.07 g, 2.75 mmol). Concentration of the filtrate under reduced pressure and dilution of the resulting residue in 2-propanol (5 mL) at reflux afforded a second crop of desired product (XIII) (180 mg, 0.5 mmol) after filtration and drying of the obtained precipitate.

Synthesis of 1-[(3R,4S)-4-cyanotetrahydropyran-3-yl]-3-[(2-fluoro-6-methoxy-4-pyridyl)amino]pyrazole-4-carboxylic Acid (XIV)

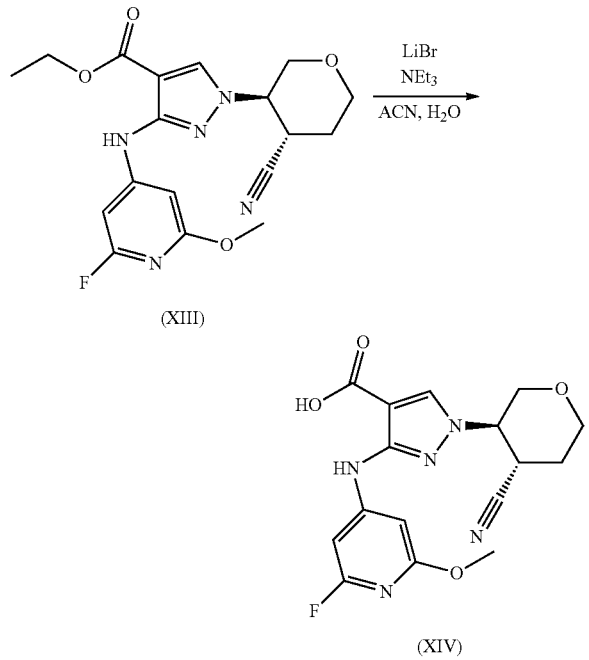

Lithium bromide (769 mg, 8.86 mmol) and triethylamine (380 μL, 2.66 mmol) were added to a solution of ethyl 1-[(3R,4S)-4-cyanotetrahydropyran-3-yl]-3-[(2-fluoro-6-methoxy-4-pyridyl)amino] pyrazole-4-carboxylate (XIII) (345 mg, 0.89 mmol) in acetonitrile (4.34 mL) and water (87 μL) and the resulting mixture was stirred at 80° C. for 20 h. The reaction mixture was cooled to room temperature, was diluted with ethyl acetate (25 mL) and was extracted with aqueous saturated sodium hydrogencarbonate (3×10 mL). The combined aqueous layers were the acidified to pH 3 by the addition of 1M aqueous hydrochloric acid. The precipitate formed was isolated by filtration and was dried under reduced pressure at 40° C. to deliver the desired product (XIV) as colorless solid (308 mg, 0.85 mmol).

HPLC Method C: Ret. Time: 0.88 min; m/z 362

Synthesis of 1-[(3R,4S)-4-cyanotetrahydropyran-3-yl]-3-[(2-fluoro-6-methoxy-4-pyridyl)amino]pyrazole-4-carboxamide (I)

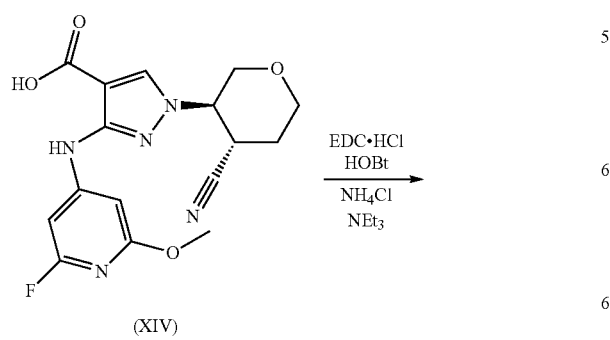

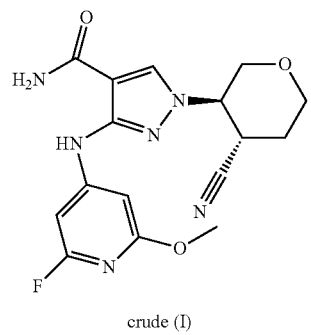

N-(3-Dimethylaminopropyl)-N'-ethylcarbodiimide hydrochloride (245 mg, 1.28 mmol), 1-hydroxybenzotriazole hydrate (131 mg, 0.85 mmol), ammonium chloride (91 mg, 1.71 mmol), triethylamine (238 μL, 1.71 mmol) and 1-[(3R,4S)-4-cyanotetrahydropyran-3-yl]-3-[(2-fluoro-6-methoxy-4-pyridyl)amino]pyrazole-4-carboxylic acid (XIV) (308 mg, 0.85 mmol) were stirred at room temperature in a mixture of tetrahydrofuran (3 mL) and of N,N-dimethylformamide (1 mL) for 90 min. Aqueous saturated sodium hydrogencarbonate (5 mL) was added to the reaction mixture and the aqueous phase was extracted with ethyl acetate (2×15 mL). The combined organic layers were washed with brine (5 mL), dried over sodium sulfate, filtered and concentrated under reduced pressure to afford the crude desired product (I) (276 mg, 0.77 mmol).

HPLC Method A: Ret. Time: 0.86 min; m/z 361

$^1$H NMR (600 MHz, CDCl$_3$) δ (ppm): 9.70 (1H, s); 8.35 (1H, s); 7.83 (1H, br s); 7.32 (1H, br s); 7.03-6.68 (2H, m); 4.64 (1H, J=4.4, 10.2 Hz, dt); 4.04 (1H, J=4.4, 11.3 Hz, dd); 3.94-3.86 (1H, m); 3.79 (3H, s); 3.71-3.59 (2H, m); 3.49 (1H, J=2.2, 11.7 Hz, dt); 2.20-2.12 (1H, m); 2.04-1.93 (1H, m)

Purification to 1-[(3R,4S)-4-cyanotetrahydropyran-3-yl]-3-[(2-fluoro-6-methoxy-4-pyridyl)amino]pyrazole-4-carboxamide (I)

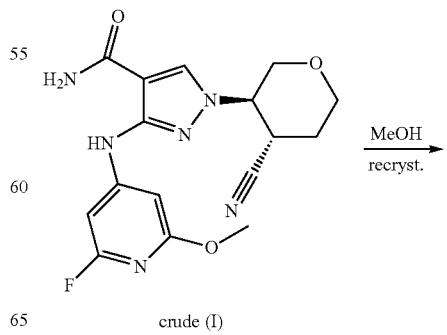

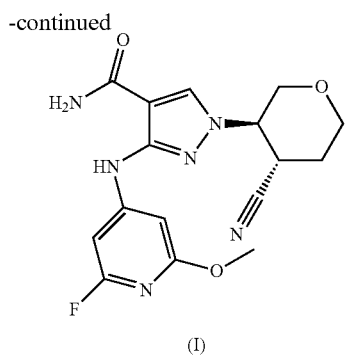

(I)

A 160 L glass-lined vessel was charged with crude (I) (3.72 kg, 10.32 mol) and methanol (80.8 L). The contents were heated to reflux (65° C.) and authentic crystal seeds of compound (I) (109 g, 302.5 mmol) charged as a slurry in methanol (1.9 L). The mixture was stirred at 275 rpm and aged for 14.5 h. The slurry was cooled to 60° C. and sampled for analysis purpose: Pure compound (I) was obtained. The slurry was cooled from 65° C. to 20° C. over 12 h and then aged at 20° C. for 6 h. The batch was filtered, and the cake was washed with methanol (5.4 L). The solid was dried at 40° C. for 23 h in a vacuum oven with a nitrogen bleed. The material was then passed through a Co-Mill to break up any lumps and compound (I) (2.21 kg, 6.14 mol) was obtained as a white powder.

Alternative Synthesis of 1-[(3R,4S)-4-cyanotetrahydropyran-3-yl]-3-[(2-fluoro-6-methoxy-4-pyridyl)amino]pyrazole-4-carboxamide (I)

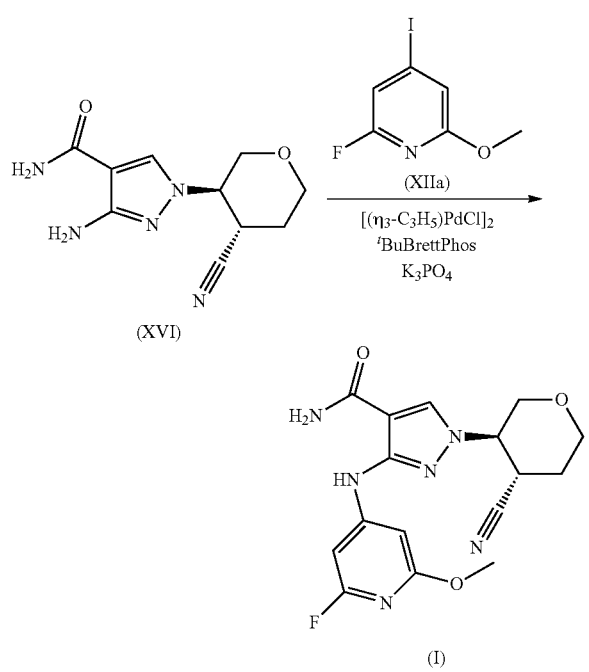

In a first vessel N,N-dimethylacetamide (7.55 L) was degassed using subsurface nitrogen for 30 min. tBuBrettPhos (96.0 g, 0.198 mol) and allyl palladium (II) chloride dimer (36.2 g, 0.099 moles) were added and the resulting mixture was stirred at 20° C. for 100 min with a subsurface nitrogen purge. Another vessel was charged with compound (XVI) (2.32 kg, 9.88 mol), with compound (XIIa) (2.50 kg, 9.88 mol), potassium phosphate tribasic (4.19 kg, 19.76 mol) and with N,N-dimethylacetamide (17.55 L). The resulting mixture was stirred and degassed and the solution of the catalyst prepared in the first vessel was added. The first vessel was rinsed with N,N-dimethylacetamide (0.5 L) which was also added to the reaction mixture. The reaction mixture was then stirred at room temperature and was monitored by UV-HPLC until full conversion was observed. The reaction mixture was filtered and the wet cake was washed with N,N-dimethylacetamide (5 L). The filtrate was cooled between 0 and 5° C. and water (90 L) was added over 105 min while maintaining the temperature between 0 and 5° C. The resulting slurry was aged 1 h at this temperature. The slurry was then filtered, and the cake was washed twice with water (10 and 20 L) and four times with methanol (15 and 3×19 L). The wet cake was dried under a nitrogen stream to deliver the desired compound (I) (3.14 kg, 0.154 mol).

The invention claimed is:
1. A process for making a compound of Formula (I)

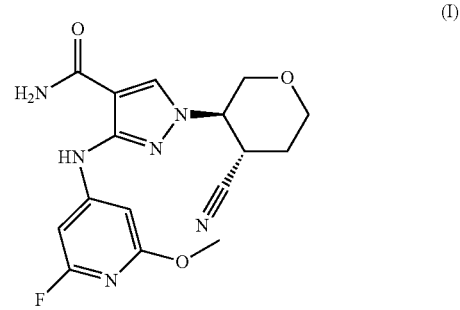 [SMILES: COc1cc(Nc2nn([C@H]3COCC[C@@H]3C#N)cc2C(N)=O)cc(F)n1]

comprising
a. reacting a compound of Formula (VI)

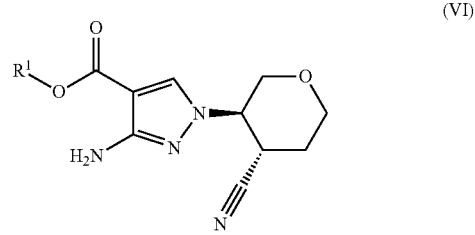

wherein $R^1$ is $C_1$-$C_4$ alkyl
with a compound of Formula (XII)

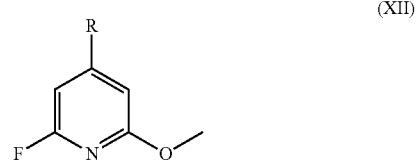

in the presence of a catalyst and of a base wherein R is I or Br, to yield a compound of Formula (XIII)

(XIII)

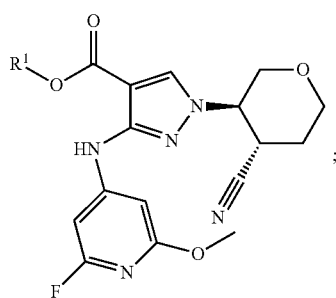

and
b. converting the compound of Formula (XIII) to the compound of Formula (I).

2. The method of claim 1, further comprising a. reacting the compound of Formula (XIII) in the presence of a trialkylamine with a lithium salt, to yield a compound of Formula (XIV)

(XIV)

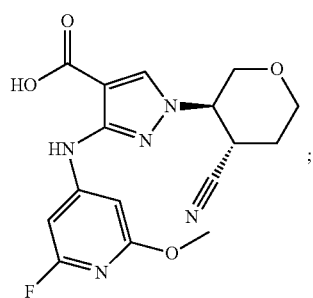

and
b. converting the compound of Formula (XIV) to the compound of Formula (I).

3. The method of claim 2, further comprising forming an active intermediate of the compound of Formula (XIV) and then reacting with ammonia or an ammonia equivalent, in the presence of a base to yield the compound of Formula (I).

4. A process for making a compound of Formula (XII), (XII)

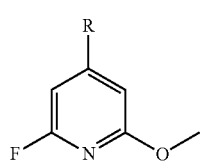

wherein R is I,
comprising
a. reacting a compound of Formula (IX)

(IX)

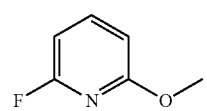

with iodine and a lithium amide base, to yield a compound of Formula (X)

(X)

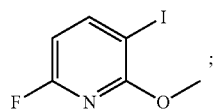

and
b. converting the compound of Formula (X) to the compound of Formula (XII).

5. The process of claim 4, further comprising in step b reacting the compound of Formula (X) in the presence of a lithium amide base to yield a compound of Formula (XII)a (XIIa)

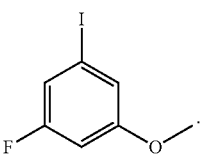

6. The process of claim 5, wherein the compound of Formula (X) is not isolated and purified before being carried on to the compound of Formula (XIIa).

7. A process for making a compound of Formula (XII), (XII)

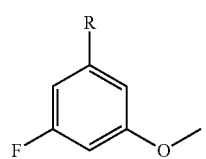

wherein R is Br,
comprising
a. reacting a compound of Formula (VII)

(VII)

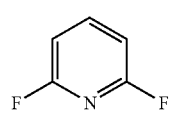

with an iridium catalyst and bis (pinacolato) diboron to yield a compound of Formula (VIII)

(VIII)

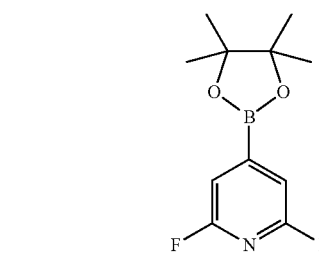

and
b. converting the compound of Formula (VIII) to the compound of Formula (XII).

8. The process of claim 7, further comprising
a. reacting the compound of Formula (VIII) with a brominating agent to yield a compound of Formula (XI)

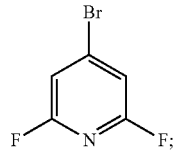
(XI)

and
b. converting the compound of Formula (XI) to the compound of Formula (XII).

9. The process of claim 8, further comprising reacting the compound of Formula (XI) with an alkali methoxide, to yield a compound of Formula (XIIb)

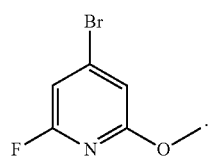
(XIIb)

10. A process for making a compound of Formula (VI)

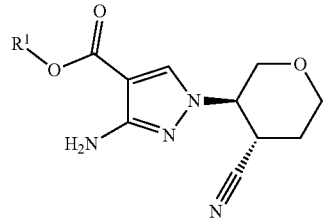
(VI)

wherein $R^1$ is $C_1$-$C_4$ alkyl
comprising
a. reacting a compound of Formula (II)

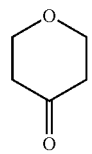
(II)

with
i. Hydrogen cyanide or an equivalent thereof and
ii. $POCl_3$ or $SOCl_2$ to yield a compound of Formula (III)

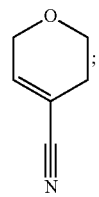
(III)

and
b. converting the compound of Formula (III) to the compound of Formula (VI).

11. The process of claim 10, further comprising
a. reacting the compound of Formula (III) with a compound of Formula (IV) in the presence of a base

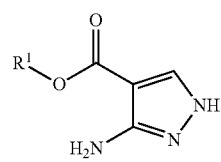
(IV)

wherein $R^1$ is $C_1$-$C_4$ alkyl
to yield a compound of Formula (V)

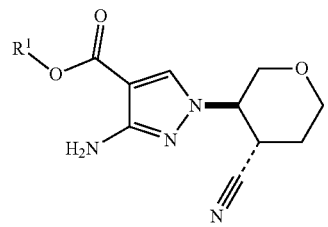
(V)

wherein $R^1$ is $C_1$-$C_4$ alkyl; and
b. converting the compound of Formula (V) to the compound of Formula (VI).

12. The process of claim 11, further comprising separating the enantiomers of the compound of Formula (V) to give the compound of Formula (VI).

13. The process of claim 12, wherein the separation of enantiomers is achieved by chiral chromatography.

14. A compound of Formula (V)

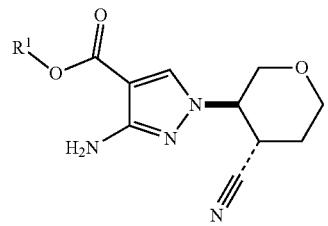
(V)

wherein $R^1$ is $C_1$-$C_4$ alkyl.

15. The compound of claim 14, wherein the compound is the compound of Formula (VI)

(VI)

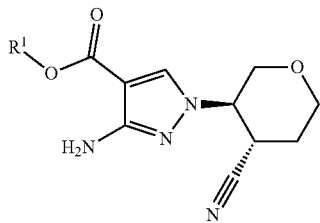

wherein R¹ is C₁-C₄ alkyl.

16. A compound of Formula (XIII)

(XIII)

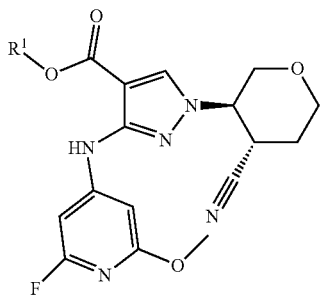

wherein R¹ is C₁-C₄ alkyl.

17. A compound of Formula (XIV)

(XIV)

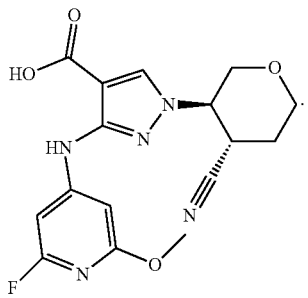

18. The process of claim 1, wherein in R¹ of the compound of Formula (VI) is ethyl.
19. The process of claim 10, wherein in R¹ of the compound of Formula (VI) is ethyl.
20. The compound of claim 14, wherein in R¹ is ethyl.
21. The compound of claim 15, wherein in R¹ is ethyl.
22. The compound of claim 16, wherein in R¹ is ethyl.
23. The process of claim 8, wherein the brominating agent is copper (II) bromide or copper (I) bromide associated to an oxidant.
24. The process of claim 10, wherein the hydrogen cyanide equivalent is trimethylsilyl cyanide (TMSCN).
25. The process of claim 11, wherein the base is potassium phosphate tribasic or potassium acetate.

\* \* \* \* \*